United States Patent [19]

Chen

[11] Patent Number: 5,259,284

[45] Date of Patent: Nov. 9, 1993

[54] CARPENTER'S SAW

[76] Inventor: Chuan-Wu Chen, No. 64-2, Chiu Sheh Lane, Chiu Sheh, Pei Ton Area, Taichung, Taiwan

[21] Appl. No.: 818,788

[22] Filed: Jan. 9, 1992

[51] Int. Cl.$^5$ .............................................. B21B 21/02
[52] U.S. Cl. ............................... 83/468.3; 83/753; 83/764; 83/765; 83/766
[58] Field of Search .............. 83/758, 468.3, 762, 83/763, 764, 765, 766

[56] References Cited

U.S. PATENT DOCUMENTS

| | | | |
|---|---|---|---|
| 30,027 | 9/1860 | Nash | 83/766 |
| 1,096,072 | 5/1914 | Swanson | 83/766 |
| 2,708,466 | 5/1955 | Stoll | 83/758 |
| 4,800,793 | 1/1989 | McCord, Sr. | 83/468.3 |

Primary Examiner—Frank T. Yost
Assistant Examiner—Allan M. Schrock
Attorney, Agent, or Firm—W. Wayne Liauh

[57] ABSTRACT

A carpenter's saw designed for use in beveling the ends or edges to form a miter joint is disclosed. The saw comprises mainly a saw base and a saw support. The saw base includes a horizontal base face having a fan-shaped portion disposed at the center thereof. The saw support is fastened to the fan-shaped portion. A hacksaw is mounted on the saw support. The saw support comprises a suspension arm which is pivoted horizontally to the bottom of the fan-shaped portion. Two seats are separately arranged at both ends of the long axis of the suspension arm. Located on each of the two seats are arc-shaped recesses which have the same curvature radii. Two rotating members are lodged separately in the two arc-shaped recesses in order to rotate along the arc-shaped rails provided. Two support rods are vertically mounted on the rotating members for the hacksaw to be fastened thereon. As a result, a change in cutting direction can be easily achieved by means of moving the suspension arm while a change in the angle of a cut surface can be attained by rotating the hacksaw.

8 Claims, 5 Drawing Sheets

CARPENTER'S SAW

BACKGROUND OF THE INVENTION

The present invention relates to a carpenter's saw, and more particularly to a carpenter's saw designed for use in beveling the ends or edges to form a miter joint.

There are generally two considerations that have to be taken into account in beveling a wood material to form a miter. One of the considerations is that the saw blade is kept in a vertical position and that the cutting direction is changed in the meantime, as shown in FIG. 1 displaying a wood material 1 and a cut surface 2. The other consideration is to change the angle of the saw blade so as to change the angle of a cut surface, as shown in FIG. 1 displaying a wood material 3 and a cut surface 4. It is a well-known fact among carpenters that the conventional way of changing a cutting direction is achieved by means of suspending firmly a saw blade on a movable support which is capable of rotating horizontally on the saw base. The change in cutting direction is made possible by changing the angle formed by the movable support and the long axis of saw base. The method of changing a cutting direction mentioned above has an inherent defect in itself that the saw blade must be held in a vertical position all the time. The remedy for the situation as such is to arrange securely a rotating member at each of both sides along the short axis of saw base. The saw blade is then suspended on the rotating members. Even though such design permits the saw blade to be held at various angles of inclination, the angle of a cutting direction remains fixed and thus can not be altered.

SUMMARY OF THE INVENTION

It is, therefore, the primary objective of the present invention to provide a carpenter's saw, which is equipped to permit a change in cutting direction as well as a change in the angle of a cut surface.

It is another objective of the present invention to provide a carpenter's saw, which is so improved that the changes in both cutting direction and angle of a cut surface can be achieved conveniently in one adjustment.

In keeping with principles of the present invention, the primary objectives of the present invention are accomplished by a carpenter's saw comprising mainly a saw base and a saw support. The saw base comprises a horizontal base face having a fan-shaped portion disposed at the center thereof. The saw support is fastened to the fan-shaped portion. A hacksaw is mounted on the saw support. The saw support comprises a suspension arm which is pivoted horizontally to the bottom of the fan-shaped portion. Two seats are separately arranged at both ends of the long axis of the suspension arm. Located on each of two seats are arc-shaped recesses which have the same curvature radii. Two rotating members are lodged separately in the two arc-shaped recesses in order to rotate along the arc-shaped rails. Two support rods are vertically mounted on the rotating members for the hacksaw to be fastened thereon. As a result, a change in cutting direction can be easily achieved by means of moving the suspension arm while a change in the angle of a cut surface can be attained by rotating the hacksaw.

DETAILED DESCRIPTION OF THE PREFERRED EMBODIMENT

Figure 1:
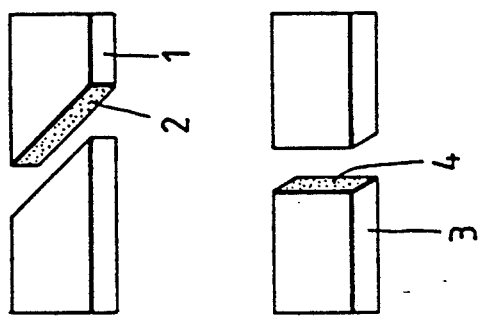
FIG. 1 shows a three-dimensional view of a wood material and a cut portion.
Figure 2:
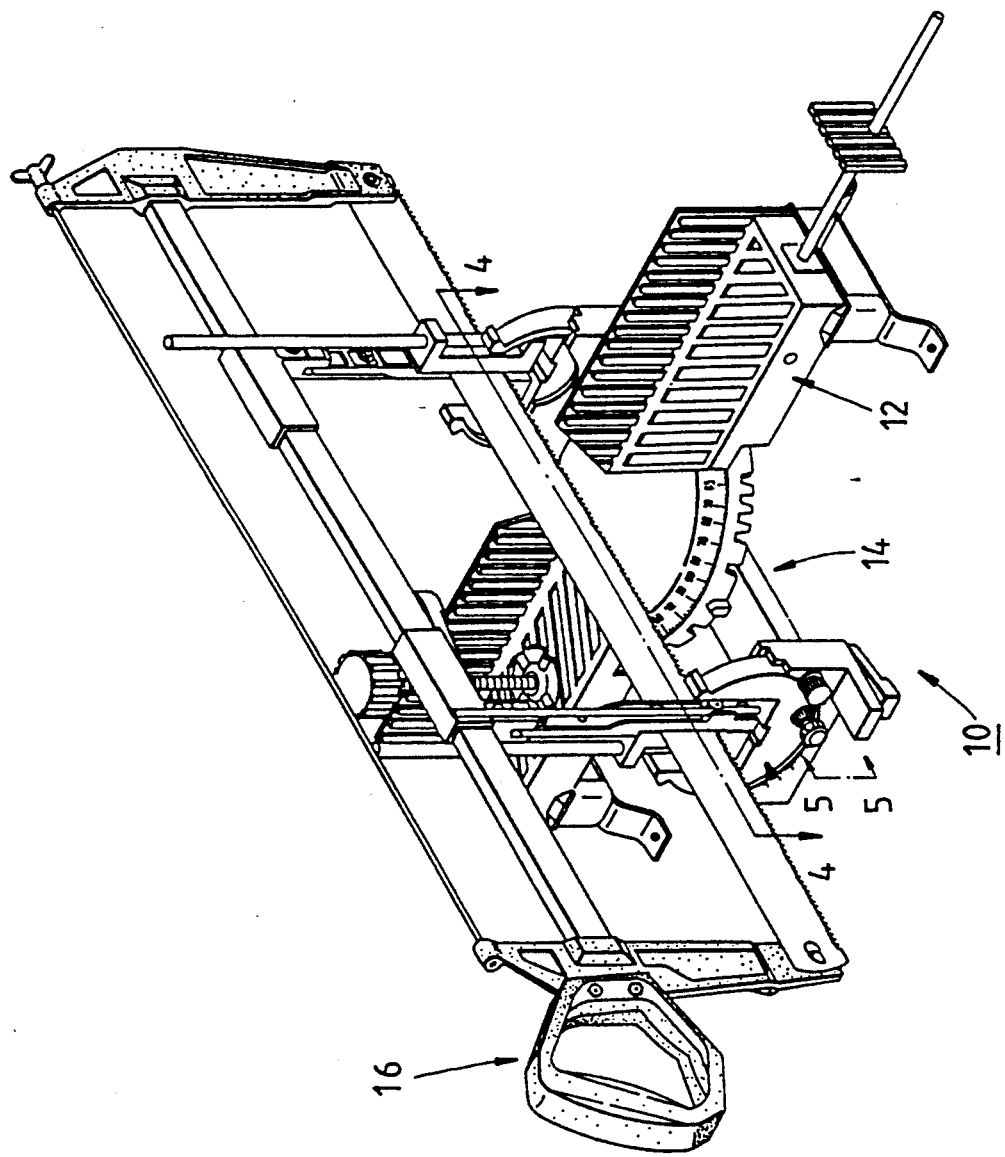
FIG. 2 shows a three-dimensional view of the preferred embodiment of the present invention.

Referring to FIGS. 1-7, a carpenter's saw 10 embodied in the present invention is shown comprising a saw base 12, a saw support 14, and a hacksaw 16.

The saw base 12 is composed of a rectangular base face 20, two support laps 21 arranged at lateral ends along the long axis of the base face 20, a fender 22 located along the long lateral side of the base face 20. Located at the center of the base face 20 is a fan-shaped portion 23 having an angle of 90 degrees. The fender 22 includes a V-shaped notch 24 located at a position corresponding to the fan-shaped portion 23. There is a scale along the arc rim of the fan-shaped portion 23. Located at lower side of the arc rim of the fan-shaped portion 23 are cavities 25 arranged therebetween at an interval of 10 degrees or of something else.

Figure 4:
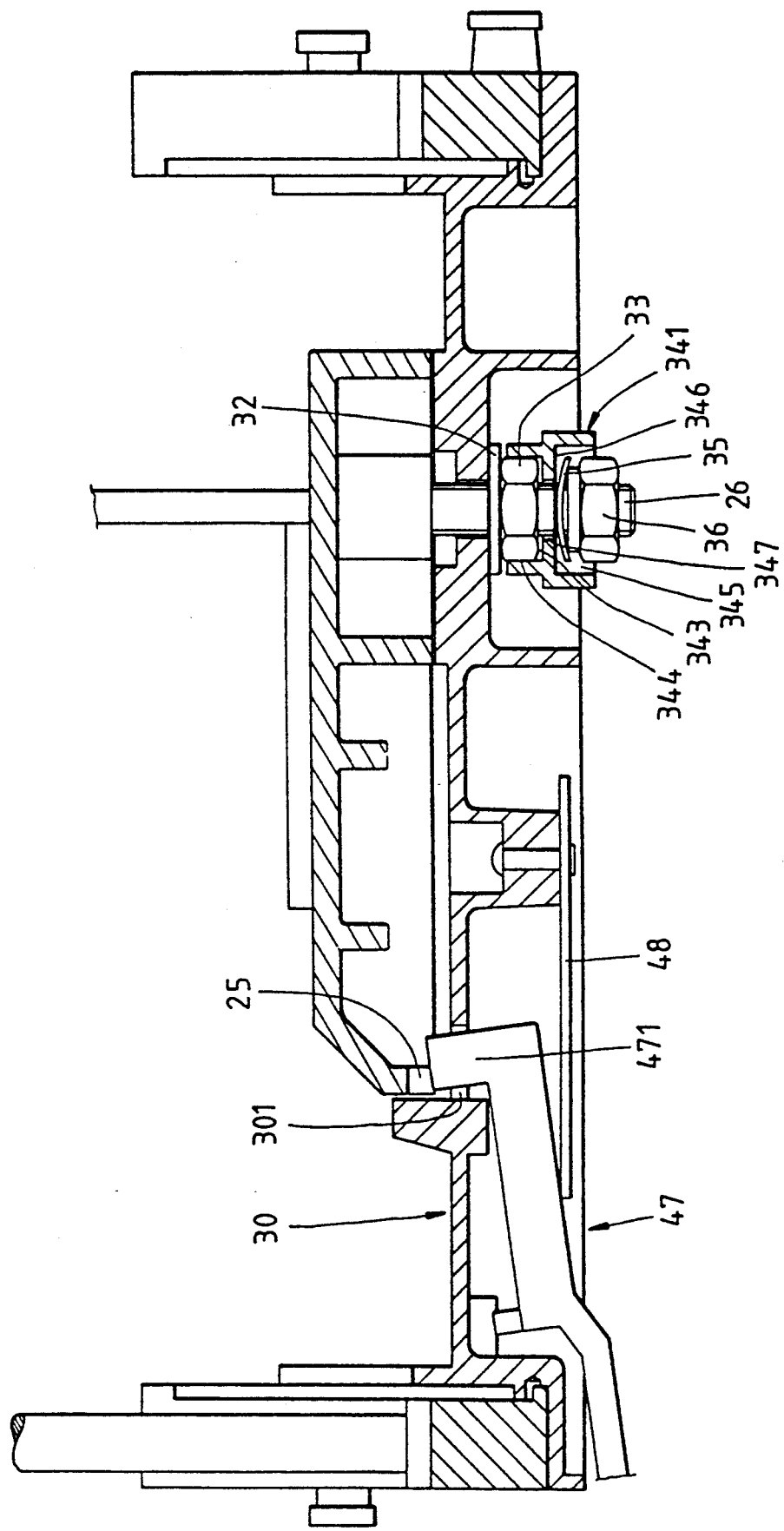
FIG. 4 shows an enlarged cut-away view of the portion taken along line 4—4, as shown in FIG. 2.
Figure 5:
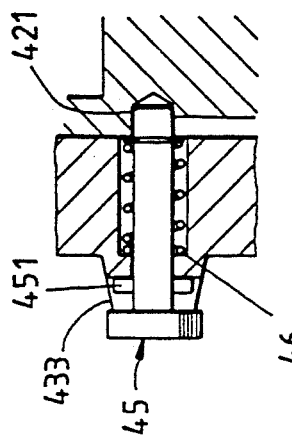
FIG. 5 shows an enlarged cut-away view of the portion taken along line 5—5, as shown in FIG. 2.

The saw support 14 is composed of a suspension arm 30 fastened to the saw base 12 by means of an axial hole 31 thereof which engages with a screw column 26 located under the fan-shaped portion 23. The suspension arm 30 is fastened securely to the saw base 12 by means of a first washer 32, a first nut 33, a fastener 34, a second washer 35, and a second nut 36, which are arranged in that order. The fastener 34 comprises a sleeve 341 and a handle 342 extending outwardly from the sleeve 341. Located at one end of the sleeve 341 is a first receiving room 343 whose wall surface has a toothed portion disposed thereon while a second receiving room 345 is arranged at other end of the sleeve 341. As shown in FIG. 4, the first and the second receiving rooms 343 and 345 are partitioned by means of an annular surface 346 which has an annular hole 347 disposed at the center thereof for allowing the screw column 26 to pass therethrough. The first receiving room 343 is used to accommodate the first nut 33 while the second receiving room 345 is used to receive the second nut 36. When the fastener 34 is associated with the screw column 26, the annular edge of the first receiving room 343 sustains the first washer 32, as shown in FIG. 4. When a carpenter tightens up the second nut 36 without tightening the first nut 33, he should be able to rotate horizontally the suspension arm 30 which uses the screw column 26 as a rotating axis thereof. On the other hand, when the first nut 33 is tightened up, the suspension arm 30 is locked and thus is unable to rotate. For the convenience of the usage of the carpenter's saw embodied in the present invention, the fastener 34 is designed in such a manner that the first receiving room 343 thereof has a toothed portion 344 disposed therein for tightening up or loosening the first nut 33 without resort to any manual tool. Each of two seats 40, which are made integrally into a unitized body of the suspension arm 30, is located at the axial end of the suspension arm 30 and has an arc-shaped recess 41 disposed therein. The arc-shaped recess 41 comprises a dike board 42 extending upwardly from the inner side thereof. These two arc-shaped recesses 41 are used to accommodate two rotating members 43 which are capable of rotating along the arc-shaped rails provided therein by two arc-shaped recesses 41. Located at the center of the rotating member 43 is an indicator 431 marked thereon for indicating the angle of the position of the rotating member 43. When the rotating members 43 are properly lodged in the arc-shaped recesses 41, a lock bolt 44, which is located at each of both sides of the front seat face 401 of the seat 40, can be tightened to permit the bolt nut 441 to position the rotating member 43 in place. There is a scale on the arc-shaped rail along the arc-shaped recess 41 on the side of the front seat face 401. In addition, for the purpose of allowing the rotating member 43 to position at angles most frequently used, a concavity 421 is set up on the dike board 42 at the position corresponding to that of an angle which is frequently used. A lock pin 45 is used to pass through the horizontally oriented through hole 432 of the rotating member 43. A coiled spring 46 is lodged in the through hole 432 in such a manner that one end thereof is received by the wall of the through hole 432 while the other end thereof serves to sustain a lock ring 452 encasing the end of the lock pin 45. The through hole 432 comprises a flange 433 disposed at front edge thereof. Located on the flange 433 is a straight groove 434 for receiving the protrusion 451 located on the shank of the lock pin 45. As long as the protrusion 451 of the lock pin 45 is not embedded in the straight groove 434, the shank of the lock pin 45 does not make contact with the dike board 42. When the rotating member 43 is turned to an angle that is frequently used, the lock pin 45 is slightly pulled outward so as to permit the protrusion 451 thereof to be inserted into the straight groove 434, resulting in the shank of the lock pin 45 to enter the concavity 421 and to be under the pressure exerted on by the coiled spring 46 so as to position the rotating member 43, as shown in FIG. 5.

Figure 3:
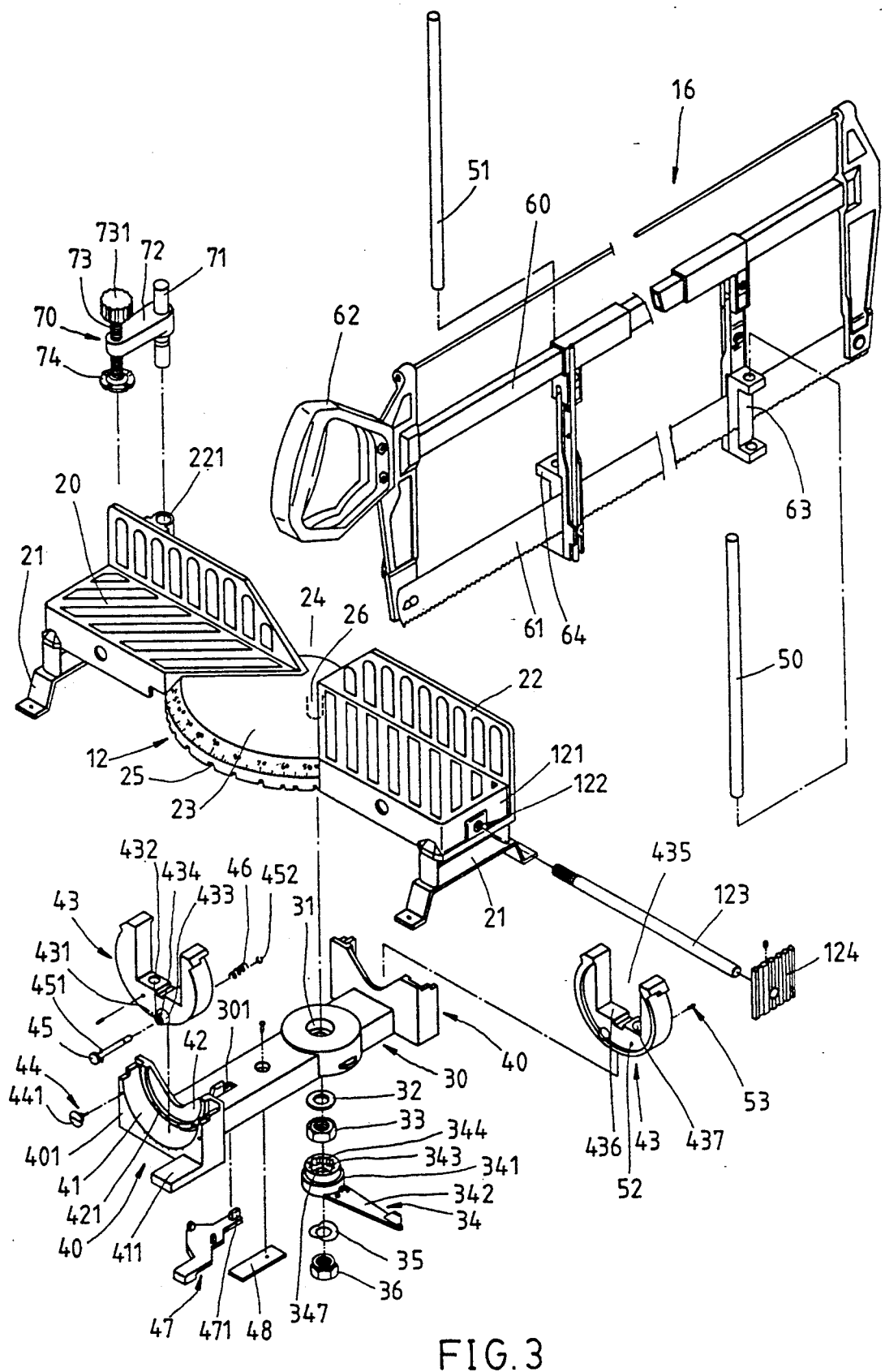
FIG. 3 shows an exploded view of the preferred embodiment of the present invention.

As shown in FIG. 3, a branch arm 47 located under the suspension arm 30 can be employed to help the latter position at an angle that is frequently used. One end of the branch arm 47 is arranged under the tugging portion 411 of the seat 40 while the other end of the branch arm 47 has a lug 471 disposed thereon for traversing the elongated hole 301 of the suspension arm 30. An elastic piece 48 fixed to the underside of the suspension arm 30 is used to press against the branch arm 47. As a result, when the lug 471 is in alignment with the cavity 25 of the fan-shaped portion 23, the elastic piece 48 serves to press against the lug 471, which is subsequently positioned in place. An upward movement of the branch arm 47 serves to remove the lug 471 from the cavity 25, as shown in FIG. 4.

Now referring to FIG. 3, the rotating member 43 is shown comprising a U-shaped cut 435 disposed at the center thereof. Located at the horizontal wall 436 are vertical through holes 437 for allowing the branch rods 50 and 51 to pass through. The side wall of vertical through hole 437 has a small screw hole 52 disposed thereon, which is to engage with a small bolt 53 in order to help secure the branch rods 50 and 51.

The hacksaw 16 comprises a saw frame 60, a grip handle 62 attached to one end of the saw frame 60, a saw blade 61, two sleeve frames 63 and 64 movably and separately mounting on the branch rods 50 and 51. The sleeve frames 63 and 64 are mounted on the saw frame 60. When sleeve frames 63 and 64 are properly mounted on the branch rods 50 and 51, the position of the hacksaw 16 is right in the U-shaped cut 435 of the rotating member 43 and is traversing the V-shaped notch 24 of the saw base 12. Therefore, the saw frame 60 and the saw blade 61 are capable of making a reciprocating movement along the long axis of the suspension arm 30.

Figure 6:
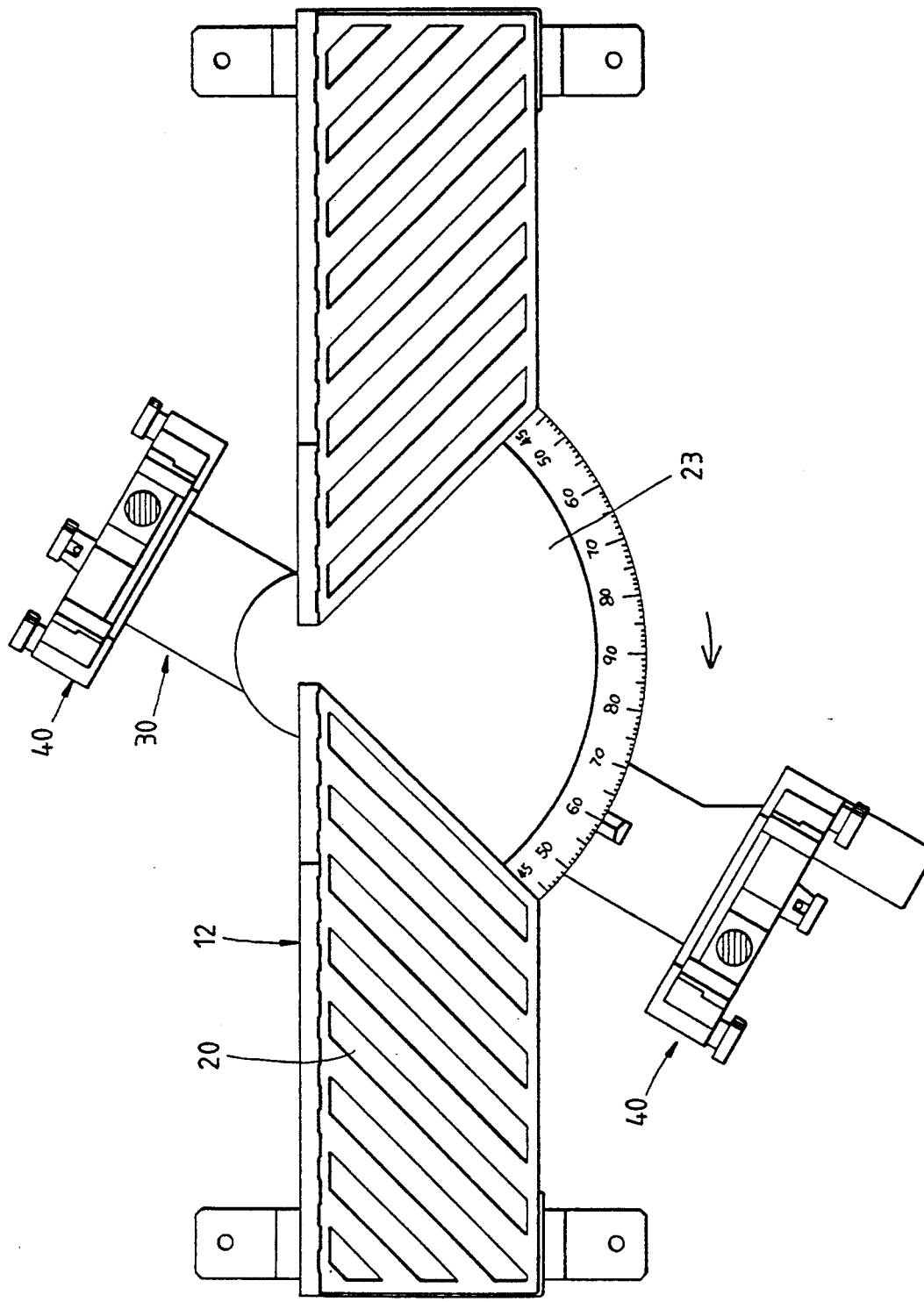
FIG. 6 shows a schematic view of a hacksaw which is made to change the cutting direction thereof according to the present invention.

When a user of the carpenter's saw of the present invention desires a change in the cutting direction without changing the cutting angle which happens to be frequently used, he or she may let the suspension arm 30 remain in a rotating state and then rotate it to a desired position, as shown by an arrow in FIG. 6. The branch arm 47 must be subsequently pulled to permit the lug 471 thereof to be embedded in the cavity 25 so as to ensure that the suspension arm 30 is securely positioned in place. As a result, the hacksaw 16 is properly positioned and is therefore ready to be used. When a specific cutting angle is called for, the second nut 36 must be loosened first. In the meantime, the suspension arm 30 must be moved to the position of a desired angle. The first nut 33 is subsequently tightened up by means of the fastener 34 in order to permit the suspension arm 30 to position itself securely in place.

Figure 7:
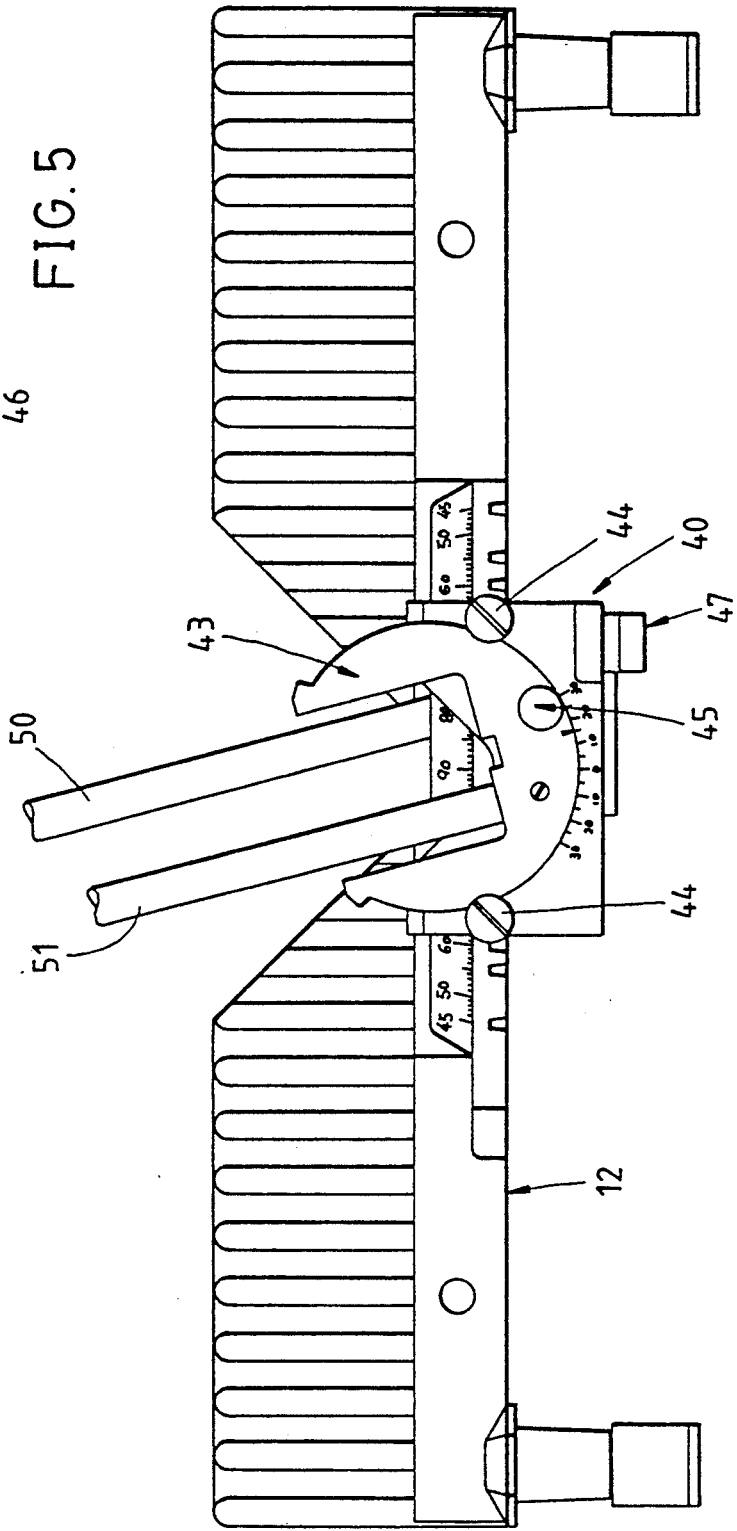
FIG. 7 shows a schematic view of a hacksaw which is made to change the cutting angle thereof according to the present invention.

As shown in FIG. 7, a change in the angle of a cut surface of the carpenter's saw 10 of the present invention is made possible by loosening the lock bolts 44 first and subsequently turning the rotating member 43 to a position of a desired angle. Thereafter, the lock bolts 44 are tightened up. As a result, the saw blade 61 of the hacksaw 16 is moved to a position where it will cut the material in accordance with a desired angle. If the desired angle of a cut surface happens to be the one that is commonly used, a user of the saw may pull the lock pin 45 to rotate the rotating member 43 to the position of the desired angle. The shank of the lock pin 45 must be inserted into the concavity 421 in order to ensure that the rotating member 43 is locked in securely at the position of the desired angle.

In addition, the carpenter's saw 10 embodied in the present invention may be equipped with a tube seat 221, which is located at one side of the fender 22 of the saw base 12 and is used to accommodate therein a set of vertically installed retaining member 70 comprising a retaining pillar 71, a top plate 72, a threaded rod 73, and a disklike press piece 74. The retaining pillar 71 is to lodged in the tube seat 221. The one end of top plate 72 is fastened to the upper portion of the retaining pillar 71 while the other end is fastened to the threaded rod 73. A The position of the disklike press piece 74 can be adjusted to press against the object intended to be cut by means of rotating the nut 731 of the threaded rod 73. There is a screw hole 122 disposed on the end surface 121 of the saw base 12 for receiving securely a horizontal branch rod 123 is used to facilitate the placement of an object to be cut while the fending piece 124 is used to orient the object to be cut.

What is claimed is:

1. A Carpenter's saw comprising:
    a saw base being composed of a rectangular base face with a fanshaped portion arranged at the center thereof;

a saw support mounted on said fan-shaped portion and characterized in that it includes a suspension arm horizontally pivoted to the bottom of said fan-shaped portion, fastening means for securely fastening said suspension arm thereto, two seats fastened separately to both ends of said suspension arm and having arc-shaped recesses of equal curvature radii disposed therein, two rotating members separately lodged in said arc-shaped recesses;

a hacksaw;

mounting means for movably mounting said hacksaw on said saw support;

a dike board extending upwardly from each of said arc-shaped recesses;

at least one concavity set up on said dike board at a position corresponding to a pre-determined angle to allow said rotating member to be easily positioned at said angle;

a branch arm disposed under said suspension arm, said branch arm having a lug disposed at one end thereof, said lug being fastened to said suspension arm by means of an elastic piece; and wherein said fan-shaped portion comprises a plurality of cavities arranged at locations corresponding to a plurality of specified angles.

2. A carpenter's saw in accordance with claim 1 wherein said carpenter's saw further comprises a lock bolt fastened to said seat in a manner that it provides a means to position securely said rotating member in place.

3. A carpenter's saw in accordance with claim 1, wherein said carpenter's saw further comprises a lock pin movably arranged to pass through said rotating member, a coiled spring lodged in said rotating member in such a manner that it exerts pressure on said lock pin to press against the inner side of seat face of said seat, and wherein said seats have a plurality of concavities located at specified angles along the inner side of said seat face.

4. A carpenter's saw in accordance with claim 1, wherein said fan-shaped portion includes a screw column disposed at the center of the bottom thereof, said screw column passing through said suspension arm and having a first nut releasably fastened thereto.

5. A carpenter's saw in accordance with claim 4, wherein said carpenter's saw further comprises a fastener having a sleeve disposed at one end thereof, and a second nut coupled to said first nut within said sleeve.

6. A carpenter's saw in accordance with claim 1 wherein said mounting means for movably mounting said hacksaw on said saw support comprises:

a saw frame in said hacksaw;

a pair of sleeve frames movably mounted on said saw frame;

a pair of branch rods for mounting said sleeve frames; and a U-shaped cut in each of said rotating member, said U-shaped cut having a bottom surface and a recess on said bottom surface for receiving said branch rod thereby allowing said sleeve frames to be mounted on said saw base.

7. A carpenter's saw in accordance with claim 1 which further comprises:

an elongated hole in said suspension arm allowing said lug to penetrate therethrough for engagement with one of said cavities in said fan-shaped portion; and a tugging portion at one end of said suspension arm to facilitate an easy upward movement of said branch arm and thereby causing disengagement of said lug from said cavity.

8. A carpenter's saw in accordance with claim 1 wherein said fastening means comprises:

a screw column located under said fan-shaped portion;

an axial hole in said suspension arm for engaging said screw column; and a fastener assembly comprising a first washer, a first nut, a fastener, a second washer, and a second nut, to be sleeved in sequence upon said screw column, said fastener having a sleeve and a handle extending radially outwardly from said sleeve, said sleeve having first and second receiving rooms at upper and lower ends respectively thereof, said first and second receiving rooms being adapted to receive said first and second nuts respectively, and said first receiving room having toothed portion thereon for rotating said first nut, wherein said second nut and said second washer being adapted to fasten said suspension arm to said fan-shaped portion while allowing horizontal rotation relative thereto, and said first nut and said first washer being adapted to securely fasten said suspension arm thereto.

* * * * *